United States Patent [19]

Scardiglia et al.

[11] 4,049,751

[45] Sept. 20, 1977

[54] EXTRACTION RESISTANT POLYOLEFIN STABILIZERS

[75] Inventors: Frank Scardiglia, Woodcliff Lake, N.J.; Kornel Dezso Kiss, Yonkers, N.Y.

[73] Assignee: Dart Industries Inc., Los Angeles, Calif.

[21] Appl. No.: 680,029

[22] Filed: Apr. 26, 1976

[51] Int. Cl.² .......................... C08K 5/10; C08K 5/13; C08L 23/12; C08F 255/02
[52] U.S. Cl. .......................... 260/876 R; 260/45.85 B; 260/878 R
[58] Field of Search .................... 260/45.85 B, 876 R, 260/878 R

[56] References Cited

U.S. PATENT DOCUMENTS

| | | | |
|---|---|---|---|
| 3,497,573 | 2/1970 | Hostetler | 260/878 B |
| 3,779,945 | 12/1973 | Dexter et al. | 260/45.85 B |
| 3,792,014 | 2/1974 | Ihrman et al. | 260/45.85 B |
| 3,849,516 | 11/1974 | Plank | 260/876 R |
| 3,951,911 | 4/1976 | Kiss | 260/45.85 B |
| 3,953,402 | 4/1976 | Kline | 260/45.85 B |
| 3,957,920 | 5/1976 | Kleiner et al. | 260/45.85 B |
| 3,970,637 | 7/1976 | Hartless et al. | 260/45.85 B |
| 3,987,086 | 10/1976 | Dexter et al. | 260/45.85 B |

*Primary Examiner*—Alan Holler
*Attorney, Agent, or Firm*—Margareta LeMaire; Bryant W. Brennan; Fred S. Valles

[57] ABSTRACT

A hindered phenolic antioxidant stablizer for polyolefins is rendered extraction resistant by complexing it with an agent containing complexing groups derived from N-vinyl-2-pyrrolidone or a N-dialkyl substituted amino alkyl ester of an $\alpha,\beta$-unsaturated carboxylic acid.

14 Claims, No Drawings

EXTRACTION RESISTANT POLYOLEFIN STABILIZERS

BACKGROUND OF THE INVENTION

It is well known to stabilize plastics, e.g. olefin polymers against degradation due to heat and oxidation by incorporating into the polymers a stabilizing amount of hindered phenolic antioxidants. However, such antioxidant stabilizers have not proved entirely satisfactory for many end uses. This is true because of the relative ease with which they can be extracted from the polymers by nongaseous fluids. For example, a plurality of individual plastic insulated wires are encased in plastic tubing to form underground cables. The void spaces within the tubing are filled with a very high viscosity liquid such as petrolatum or petroleum jelly. A serious disadvantage to the use of plastic materials as insulators for this application has been the fact that at least a portion of the stabilizing amount of the antioxidants incorporated into the plastic insulation is extracted into the petrolatum. This causes a rapid deterioration of the insulation due to the combined effects of heat and oxidation.

Another serious disadvantage to the use of plastic materials, e.g. polyolefin resins as insulation for wire and cables is the fact that the degradation of the polymer is accelerated by the presence of copper and alloys of copper. Prior art methods to solve this problem have resulted in a combination of the polyolefin resin with the primary hindered phenolic antioxidant and a copper deactivator or chelating agent such as organic hydrazide or hydrazine compounds. However, these methods do not solve the problem when the resulting compositions are contacted with petrolatum. In fact, test results have indicated that the deactivation due to copper is often accelerated even further after the polymeric material has been subjected to extraction with petrolatum.

It is therefore a primary objective of this invention to provide a novel hindered phenolic antioxidant complex which exhibits resistance to extraction with hydrocarbons such as petrolatum.

It is another object of the invention to provide a novel extraction resistant stabilized polyolefin composition.

It is a further object to provide a polyolefin composition useful in underground wire and cable applications.

Other objects of the invention will become apparent from the detailed description and appended claims.

THE INVENTION

In accordance with the present invention there is provided a novel primary antioxidant composition which comprises a complex of hindered phenolic antioxidant and a high molecular weight nitrogeneous complexing agent derived from compounds selected from the group consisting of N-vinyl pyrrolidone and N-dialkyl substituted amino alkyl esters of $\alpha,\beta$-unsaturated carboxylic acids.

The hindered phenolic antioxidant component of the complex can be selected from any of the multitude of well known compositions containing at least one hindered phenolic group and having a stabilizing effect on polyolefin compositions against degradation due to exposure to heat and oxygen.

Although not limited thereto, one particularly suitable primary phenolic antioxidant is one selected from mono and polyesters of alkane polyols, at least one of such ester groups comprising the acyl moiety:

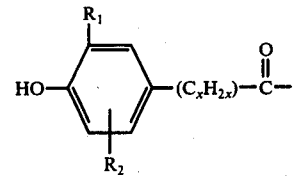

(I)

in which $R_1$ and $R_2$ independently are a lower alkyl group containing 1 to 5 carbon atoms, and $x$ has a value of from 1 to 6 and preferably 2. The preferred lower alkyl groups are the tertiary alkyls. Each of the remaining hydroxyl groups of the alkane polyol may be unesterified, esterified by the said acyl group, or esterified by alkanoyl of from 1 to 20 carbon atoms. The preferred phenolic antioxidants are those who are fully esterfied with the aforementioned acyl groups. Specific alkane polyols include ethylene glycol; 1,2-propanediol; 1,3-propanediol; 1,4-butanediol, 1,6-hexanediol, 1,2-octanediol; 1,7-heptanediol; 1,2,3-butanetroil; glycerol; neopentyl glycol; erythritol; pentaerythritol; sorbitol; 2.5-hexanediol; 1,1,1-trimethylolpropane; and 2,2,4-trimethyl-1,3 pentanediol and the like. All of these compounds are known, see e.g. U.S. Pat. No. 3,285,855 incorporated herein by reference.

The nitrogeneous complexing agent should have a relatively high molecular weight, and containing complexing groups derived from either N-vinyl pyrrolidone or N-dialkyl substituted amino alkyl esters of $\alpha,\beta$-unsaturated carboxylic acids. N-vinyl pyrrolidone is a readily available material. Its preparation is well known in the art and need not be discussed in any further detail. The N,-dialkyl substituted amino alkyl esters of $\alpha,\beta$-unsaturated carboxylic acid esters with dialkyl amino alkanols. These compounds include the N-dialkyl substituted amino esters of $\alpha\beta$-unsaturated mono or dicarboxylic acids such as acrylic acid, methacrylic acid, ethacrylic acid, maleic acid, fumaric acid, itaconic acid, crotonic acid etc.. The alkoxy portion of these esters may be represented by the following formula:

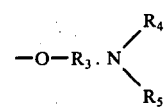

(II)

$R_3$ is an alkylene group and $R_4$ and $R_5$ each is an alkyl group. Typically, $R_3$ is an alkylene group having 2 to 10 carbon atoms. $R_4$ and $R_5$ independently can be alkyl group typically containing from 1 to 18 carbon atoms, however, even longer alkyl chains are suitable.

Polymeric complexing agents of the present invention include homopolymers of N-vinyl pyrrolidone or N-dialkyl substituted amino esters of $\alpha,\beta$-unsaturated carboxylic acids, random or block copolymers based on any of these compounds, as well as graft copolymers having polymeric side chains of the aforementioned compounds, grafted onto a preformed polymer backbone. Aside from the requirement that the polymeric complexing agents be based on these compounds, there are no other critical limitations as to the chemical nature of the polymer, and a number of polymerizable compounds can be used in preparing the random copolymers, the remaining blocks of the block copolymers and the polymeric backbone of the graft copolymers. For instance, suitable polymerizable compounds include the common vinyl aromatic compounds such as styrene, alkyl and halogen substituted styrenes, as well as olefins, dienes, vinyl halides, vinylidene halides, vinyl esters, suitable mixtures thereof, and many others. Preferably, however, the polymerizable compounds are comprised of α-olefins and particularly α-olefins having from 2 to 8 carbon atoms per molecule, such as ethylene, propylene, butylenes, pentenes, etc. and mixtures thereof. It should be understood that when the polymeric complexing agents of the present invention are either in the form of block copolymers or graft copolymers, the other blocks of the block copolymers as well as the preformed polymeric backbone of the graft copolymer can themselves be either homopolymers or random or block copolymers of such α-olefins.

These complexing agents in the form of block copolymers and graft copolymers are readily prepared using the conventional polymerization techniques therefor. For instance, the method disclosed in U.S. Pat. No. 3,497,573 incorporated herein by reference is useful in the production of block copolymers based on polypropylene and containing terminal blocks derived from vinyl compounds including N-vinyl pyrrolidone and esters of α,β-unsaturated carboxylic acids. Similarly, any graft polymerization technique employing free-radical conditions can be used in preparing the aforementioned graft copolymers. A particularly advantageous method is the so-called powder grafting technique in which particulate olefin polymer is admixed with the grafting compound and an organic peroxide initiator and reacted to completion at a temperature below the softening point of the olefin polymer. In order to maintain a substantially dry reaction mixture during the reaction the concentration of unreacted grafting compound should generally not exceed 10% based on the weight of the reaction mixture during any time of the reaction. Therefore, when higher concentrations of grafts are desired in the final product, the required quantity of grafting compound should be added to the reaction mixture in increments or on a continuous basis commensurate with the consumption thereof as the reaction proceeds. After completion of the reaction, the product is recovered directly from the reaction zone in particulate form. Residual quantities of peroxide and other volatile matter that may be present in the product can be removed by conventional means, e.g. by drying.

The polyolefin base resins to be stabilized with the antioxidant complex of this invention comprise solid, substantially crystalline polyolefins including homopolymers and copolymers of α-olefins having 2 to 8 carbon atoms and blends thereof. Among the preferred polyolefins are the polypropylene based resins containing at least 60 percent by weight, preferably at least 75 percent polymerized propylene groups, e.g. propylene homopolymer and, the ethylene-propylene polymer resins, such as random or block copolymers of ethylene and propylene, blends of homopolymers of propylene and ethylene, and various combinations thereof, wherein the ethylene in either homo-or copolymerized state accounts for from about 2 to about 25 percent by weight of the total resin and more preferably from about 3 to about 15 percent.

It is to be understood that the scope of the present invention not only covers stabilized polyolefin compositions, wherein any one of the above-disclosed polyolefin resins is blended with appropriate amounts of the aforementioned polymeric or nonpolymeric complexing agents and the hindered phenolic antioxidant, but also such compositions, wherein the total amount of said polyolefin base resin has been employed in preparing the polymeric complexing agent by a graft or block copolymerization technique and the so modified polyolefin is then blended only with the hindered phenolic antioxidant component.

Generally, the hindered phenolic antioxidant component is added in quantities sufficient to provide a concentration of from about 0.01 to about 5 percent based on the weight of the polyolefin. The complexing agent should be present in the composition in amounts sufficient to provide, based on the weight of the polyolefin, from about 0.3 to about 10 percent by weight of complexing groups derived from N-vinyl pyrrolidone or from a N-dialkyl amino alkyl ester of an α,β-unsaturated carboxylic acid. Since the phenolic antioxidant and the complexing agent components are readily complexed, no separate reaction facilities are needed, and the components can therefore merely be blended using conventional techniques for incorporating stabilizers into resins, i.e. by using a Banbury mixer, by milling on a two-roll mill, by melt extrusion etc..

When the stabilized polyolefin composition is to be used to insulate copper and copper alloy wires, it is customary also to include a metal deactivator or chelating agent often referred to as a secondary stabilizer. Preferably, the secondary stabilizer should be one of the well known organic hydrazide or hydrazine compounds commonly used for this specific purpose, e.g. the compounds disclosed in U.S. Pat. Nos. 3,438,935; 3,484,285; 3,660,438; 3,752,865 and 3,772,245, all incorporated herein by reference. When used, the secondary stabilizers are added in quantities sufficient to provide a concentration of from about 0.01 to about 5 percent based on the weight of the total polyolefin composition.

It is also contemplated to incorporate a thioester synergist such as dilauryl thiodipropionate (DLTDP) or distearylthiodipropionate (DSTDP) into the polyolefin composition, usually in amounts not exceeding 1.5 percent, preferably in the range of about 0.5 to 1.3 percent based on the total weight of the composition.

In addition, the compositions of this invention can also contain other optional ingredients such as ultraviolet stabilizers, pigments, delustrants, plasticizers, flame retardant materials, anti-static agents, processing aids, and any other additive which is known in the art to impart a particular property to the composition for a particular application.

In order to provide a better understanding of the invention, reference is made to the following examples, which are to be considered only as illustrative but not a limitation of the invention.

EXAMPLE I

A graft copolymer of N-vinyl-2 pyrrolidone grafts on polypropylene was prepared by charging 100 parts by weight polypropylene powder (average particle size in the range of 0.01 mm to 4mm), 5 parts N-vinyl-2 pyrrolidone (NVP) and 1 part t-butyl peracetate (75 percent solution in benzene) to a reactor equipped with a stirrer. The ingredients were well mixed and had an overall dry appearance. The system was purged with argon and the reactor was heated to 125°-130° C under autogeneous pressure. The mixture was maintained at this temperature for 4 hours, followed by cooling and devolatilization with vacuum and direct recovery of the reaction product in particle form.

Similar graft copolymers were prepared using essentially the above procedure except for variation in the N-vinyl-2 pyrrolidone content (respectively 0.25; 0.75 and 1.5 parts per 100 parts polypropylene).

EXAMPLE II

A graft copolymer of 5 parts by weight N,N-dimethyl amino ethyl methacrylate (DMAEMA) 100 parts on polypropylene powder (particle size 0.01-4 mm) was prepared following the general procedure of Example I, except that N,N-dimethyl amino ethyl methacrylate was used instead of N-vinyl-2-pyrrolidone and the reaction was carried out for 5 hours instead of 4 hours.

EXAMPLES III - XII

Ungrafted polypropylene and the grafted polypropylenes from Examples I and II were blended with the amounts of primary and secondary stabilizers indicated in Table I below until homogeneous compositions were obtained. Each of the blended samples was then compression molded into 6 inches × 6 inches × 10 mil. plaques at 400° F and 25,000 psig for 60 seconds. The plaques were rapidly cooled at high pressure and cut into 1½inches × 1½ × 10 mil. strips. One set of strips was submerged in U.S.P. Grade petrolatum at 86° ± 1° C for 18 hours. The strips were removed from the petrolatum, wiped clean and tested using differential scanning calorimetry (DSC). This analysis provides an extremely effective method for obtaining accelerated aging data which can be extrapolated to periods of decades at ambient temperatures.

The controls and examples were all tested by the following DSC procedure:

A small sample of the 10 mil. film strip prepared in the compression mold having a diameter of approximately 0.25 is placed on a copper test pan in a Perkin-Elmer differential scanning calorimeter (DSC). The pan is then covered and heated from room temperature at a linear programmed rate of 10° C/min. in the presence of nitrogen flowing through the DSC at a rate of 0.08 cu. ft. per hour. When the temperature in the DSC reaches 200° C, the nitrogen is automatically stopped and oxygen flowing at the same rate is passed through the DSC. The temperature is maintained at 200° C until the oxidation peak has occurred and the induction period is measured in minutes from the time oxygen is added until the oxidative degradation occurs. The longer the induction period, the greater the stability of the composition.

TABLE I

Effect of Content of Complexing Groups on Polypropylene Stability

Composition: parts per 100 parts polypropylene

| Example No. | PP | NVP | DMAEMA | Primary[1] Stabilizer | Secondary[2] Stabilizers A[2] | B[3] | C[4] | DSC Stability - Min. Before Extraction | After Extraction |
|---|---|---|---|---|---|---|---|---|---|
| III | 100 | — | — | 1 | — | — | — | 120 | 10 |
| IV | 100 | — | — | 1 | 1 | — | — | 120 | 17 |
| V | 100 | — | — | 2 | 1 | — | — | 120+ | 24 |
| VI | 100 | 0.25 | — | 1 | — | — | — | 100 | 14 |
| VII | 100 | 0.25 | — | 1 | 1 | — | — | 109 | 8 |
| VIII | 100 | 0.75 | — | 1 | 1 | — | — | 88 | 45 |
| IX | 100 | 1.5 | — | 1 | 1 | — | — | — | 65 |
| X | 100 | 5.0 | — | 1 | 1 | — | — | 123 | 124 |
| XI | 100 | 5.0 | — | 1 | — | 1 | — | — | 86 |
| XII | 100 | 5.0 | — | 1 | — | — | 1 | — | 44 |
| XIII | 100 | — | 5.0 | 1 | 1 | — | — | — | 100 |

[1]penta erythritol tetraester of 3(3,5-di-t-butyl, 4 hydroxy phenyl) propionic acid
[2]N-salicylidene-N'-salicyl hydrazide
[3]Oxalic acid bis (benzylidene hydrazide)
[4]N,N'''-diacetyl-N',N''-adipoyl dihydrazide As demonstrated by the data of Examples III - V, polypropylene compositions stabilized with varying amounts of primary and secondary stabilizers but containing no complexing groups exhibited very good DSC stability before treatment with petrolatum but poor stability after such treatment, which obviously was due to a loss of stabilizers from the composition due to extraction. The beneficial effect of including complexing groups into the polypropylene compositions to improve extraction resistance of the stabilizer system is readily apparent from a direct comparison of the data from Examples VIII - XIII with those of Example IV.

The importance of maintaining the concentration of complexing groups in the composition of at least 0.3 percent by weight is apparent from the results of Examples VI and VII.

EXAMPLES XIV - XVIII

Another set of experiments were made demonstrating the feasibility of adding this complexing agent as a concentrate to an unmodified polypropylene composition. The complexing agent was the grafted polypropylene of Example X, i.e. one containing approximately 5 percent by weight of NVP complexing groups. Blends were prepared of the complexing agent and with overall NVP contents of 4, 3, 2, 1.5, and 1 % respectively, which blends were stabilized with primary and secondary stabilizers in the proportions indicated in Table II, which also shows the results of testing of the blends using the procedures described above in connection with Examples III - XIII.

TABLE II

| Example | NVP- % | Stabilizers - % Primary[1] | Secondary[2] | DSC Stability - Min. After Extraction |
|---|---|---|---|---|
| XIV | 4 | 1 | 1 | 124 |
| XV | 3 | 1 | 1 | 77 |
| XVI | 2 | 1 | 1 | 65 |
| XVII | 1.5 | 1 | 1 | 75 |
| XVIII | 1 | 1 | 1 | 50 |

[1]penta erythritol tetraester of 3(3,5-di-t-butyl, 4 hydroxy phenyl) propionic acid
[2]N-salicylidene-N'-salicyl hydrazide It is obvious to those skilled in the art that many variations and modifications can be made to the compositions of this invention. All such departures from the foregoing specification are considered within the scope of this invention as defined by this specification and the appended claims.

What is claimed is:

1. A composition of matter which comprises a complex of a hindered phenolic antioxidant and a high molecular weight polymeric nitrogenous complexing agent having complexing group derived from N-vinyl-2-pyrrolidone.

2. The composition of claim 1 wherein the complexing agent is a copolymer of at least one α-olefin having from 2 to 8 carbon atoms per molecule and N-Vinyl-2-pyrrolidone.

3. The composition of claim 2, wherein the complexing agent is a graft copolymer having a backbone derived from at least one of said α-olefins and side chains derived from N-vinyl-2-pyrrolidone.

4. The composition of claim 2 wherein at least one of said α-olefins is propylene.

5. The composition of claim 4 wherein the complexing agent is a polypropylene grafted with N-vinyl-2 pyrrolidone side chains.

6. The composition of claim 1 wherein the phenolic antioxidant is a mono or polyester of alkane polyols, at least one of such ester groups comprising the acyl moiety

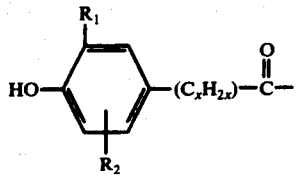

in which $R_1$ and $R_2$ independently are a lower alkyl group containing 1 to 5 carbon atoms and $x$ has a value of from 1 to 6.

7. The composition of claim 6 wherein the phenolic antioxidant is pentaerythritol tetraester of 3(3,5-di-t-butyl, 4-hydroxy phenyl) propionic acid.

8. The composition of claim 1 also containing a polyolefin base resin.

9. The composition of claim 8 wherein the polyolefin base resin is selected from homopolymers and copolymers of α-olefins having 2 to 8 carbon atoms, and mixtures thereof.

10. The composition of claim 9 wherein the polyolefin base resin is a propylene polymer.

11. The composition of claim 2 containing from about 0.01 to about 5 percent by weight of the hindered phenolic antioxidant.

12. The composition of claim 2 containing from about 0.3 to about 10 percent by weight of complexing groups.

13. The composition of claim 2 containing from 0.01 to about 5 percent by weight of a metal chelating agent.

14. The composition of claim 2 containing from about 1.5 to about 5 percent by weight of complexing groups.

* * * * *